United States Patent [19]

Moosmann

[11] 3,820,412
[45] June 28, 1974

[54] ADVANCING DRIVE FOR SLIDES ON MACHINE TOOLS

[76] Inventor: Alois Moosmann, 11, Muttergartenwey, Stuttgart-Birkach, Germany

[22] Filed: Dec. 19, 1972

[21] Appl. No.: 316,471

[30] Foreign Application Priority Data
Dec. 20, 1971 Germany.......................... 2163242

[52] U.S. Cl. ................................................ 74/422
[51] Int. Cl. ............................................. F16h 1/04
[58] Field of Search ...................................... 74/422

[56] References Cited
UNITED STATES PATENTS

| | | | |
|---|---|---|---|
| 2,343,504 | 3/1944 | Gallimore | 74/422 UX |
| 3,041,895 | 7/1962 | Rollat | 74/422 X |
| 3,116,556 | 1/1964 | Nyberg et al. | 74/422 X |

Primary Examiner—Leonard H. Gerin
Attorney, Agent, or Firm—Watson, Cole, Grindle & Watson

[57] ABSTRACT

An advancing drive for slides and carriages on machine tools in which the slide is carried by rolling bodies on guide rails, comprises a pinion which is mounted on a drive shaft and engages a rack. At least one guide rail is constructed as a rack and its teeth are engaged by the drive pinion.

8 Claims, 9 Drawing Figures

Fig. 4

ADVANCING DRIVE FOR SLIDES ON MACHINE TOOLS

BACKGROUND OF THE INVENTION

1. Field to which invention relates

The present invention relates to an advancing drive for slides on machine tools.

The efficiency of a machine tool and the quality of the workpieces which it turns out depend upon the stiffness or rigidity of the machine, that is to say on its deformation under the action of forces existing between the tool and the workpiece during the machining operation, and which vary within wide limits. Of paramount importance as regards this stiffness is the drive for the displacement of the slide and its guide means.

2. The prior art

For the advancing drive use is conventionally made of a rack and pinion, a lead screw and lead nut, a worm rack and a worm and an oil hydraulic cylinder with a piston. The lastmentioned construction is of little rigidity or stiffness owing to the physical compressibility of the oil. And such drives are used owing to their ease of control. A very widespread drive involves the use of a lead screw and nut. In this case using a nut and counternut it is comparatively easy to ensure that the transmission of force occurs with very little play. The value of such a drive is, however, considerably impaired owing to the lack of stiffness which is due to the unavoidable length of the lead screw which is subject to elongation. The stiffness or rigidity is furthermore impaired by the attachment of the lead screw at the end of the slider. Racks and pinions suffer from the basic disadvantage that over one third of the displacing force acts as a transverse force owing to the tooth engagement and impairs the position of guidance in the case of conventional slide guiding systems with play. Furthermore, the taking up of play between the rack and the pinion is problematical.

SUMMARY OF THE INVENTION

One aim of the invention is to avoid these disadvantages and to provide for a high degree of stiffness or rigidity. The invention makes use of a pinion and rack because these elements can be produced with a very high degree of precision without difficulties and have a very high efficiency. Obtaining high rapid travel speeds also presents no problems. In particular, in conjunction with a pre-loaded rolling body, a guiding device in accordance with U.S. Pat. No. 3,236,569 (equivalent to British Pat. No. 1,024,083) of the applicant a very advantageous construction is achieved in accordance with the invention by adopting the feature that the guide rails of the guiding device are constructed as racks. The disengaging force of one or more pinions, which in the case of the engagement of teeth corresponds to approximately one third of the peripheral force to be transmitted, is directly taken up by the pre-loaded rolling body guiding device, without there being any disadvantageous effect on the position of the slide guiding means. The stiffness resulting enables the engagement of pinions with the gear rack to be pre-loaded in order to avoid any play.

For the pre-loading itself a particularly advantageous construction has been developed in accordance with the present invention. A pinion is made integrally with the driving shaft or is connected with the latter in a manner which fully resists the application of a torque. A second pinion is arranged on the drive shaft in a rotary manner but cannot be slid on it. The connection between the pinion and the drive shaft is carried out by means of a clamping coupling, which is mounted on the drive shaft in such a manner that it can slide but cannot be turned. A spur gear means constructed in accordance with the invention on the clamping coupling engages a similar coupling on the pinion. On displacement of the clamping coupling by means of a nut the tooth angle results in a twisting of the pinion to a limited extent. It is necessary to set the angle between one pinion tooth, a spur wheel tooth and a guiding wedge on the shaft with the conventional tolerance in such a manner that on displacement of the clamping coupling a twisting of the pinion is produced in the direction of the desired pre-loading.

The spur gearing in accordance with the invention departs from previously proposed spur gearing systems in that the tooth flank angle so varies with the radial distance from the center point that over the whole axial displacement engagement of the teeth flanks is provided for. This changing angle is brought about by swinging the tool producing the flank with the radial distance from the center point. In this manner it is possible to produce a very rigid or stiff connection between the driving shaft and the pinion, which can be set as regards twisting in order to obtain a preloading of the tooth engagement with the tooth rack to the required extent.

The construction in accordance with the invention of the advancing drive makes possible in a simple manner the arrangement of two guide rails, provided with gear teeth, and several drive shafts with a corresponding number of pinions in order to reduce the advancing force to be transmitted per gear tooth so that there is a concomitant increasing in stiffness or rigidity.

In the case of the embodiments of the invention to be described in what follows the whole advancing drive was arranged in the machine table to be displaced in order to achieve a comparatively small workpiece for the precise machining of the required bearing holes, and furthermore to achieve easy accessibility of the built-in transmission or gearing parts. The arrangement can naturally also be reversed.

LIST OF SEVERAL VIEWS OF THE DRAWINGS

In the accompanying drawings the subject matter of the invention is shown in various embodiments.

DESCRIPTION OF PREFERRED EMBODIMENTS

Figure 1:
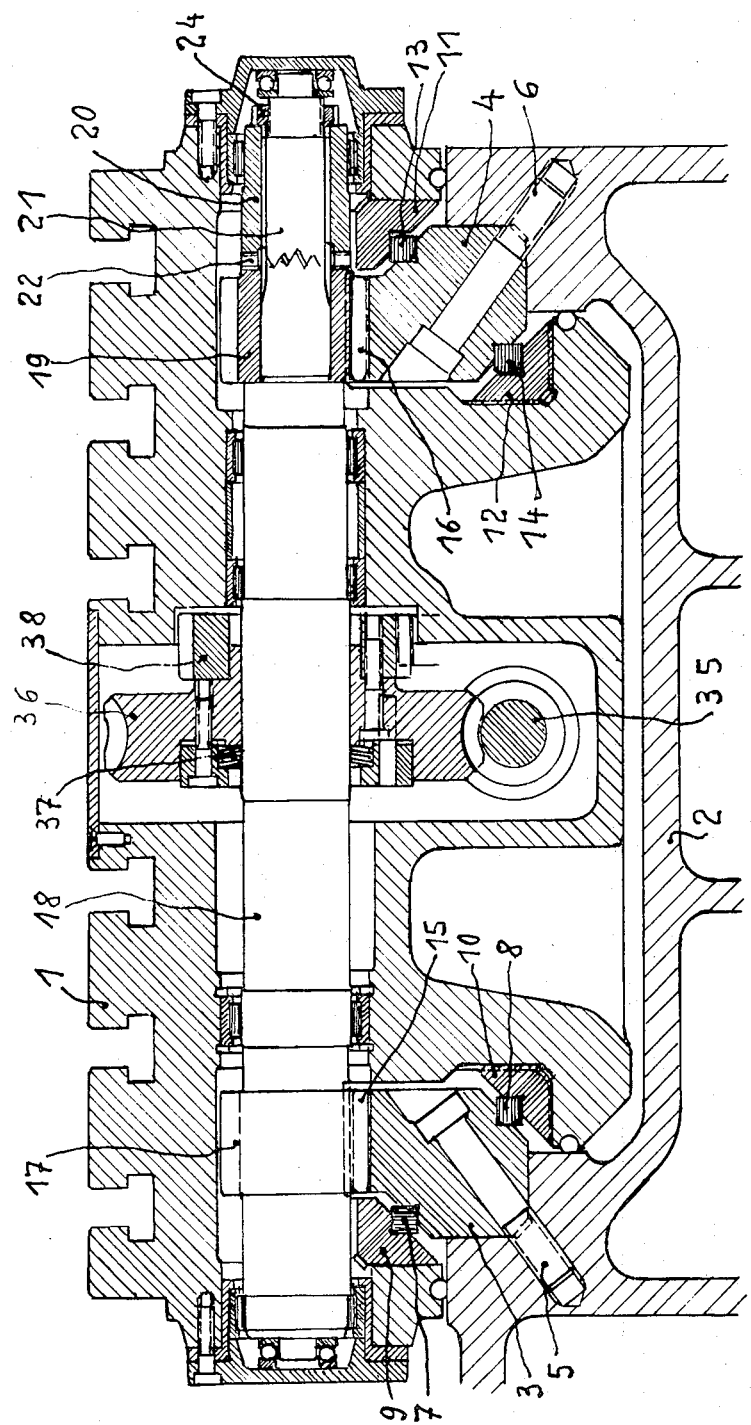
FIG. 1 shows in vertical cross-section a machine tool table with a pre-loaded roller guidance device and a built-in advancing drive via two racks, against which two pinions are pressed by pre-loading means.

FIG. 1 shows a machine tool table 1 which can be displaced on a bed 2. The table is guided by two preloaded roller guiding devices. The guide rails 3 and 4 are fixed in prism on the bed 2 in prismatic elements by means of screws 5 and 6. In the grooves of the guide rails 3 the rollers 7 and 8 are arranged in a criss-cross manner, that is to say with their axes alternately vertical and horizontal. As a result a guiding device is produced which is effective both in the vertical and also in the horizontal direction. The track rail 9 is embedded with parallel sides in a prismatic element on the table 1. The track rail 10, on the other hand, lies with conical sides in a correspondingly conical prismatic element of the table 1. By axial displacement of the track rail 10 the guiding device is pre-loaded both in a vertical and also in a horizontal direction as may be required. Like the track rail 9 the track rail 11, and like the track rail 10 the track rail 12 are mounted in corresponding prismatic elements on the table 1. The rollers 13 and 14 are, however, mounted with a parallel axis. Accordingly this guiding device or system only operates in a vertical direction but is, however, also capable of being pre-loaded. As already mentioned this guidance system corresponds basically to U.S. Pat. No. 3,236,569 (equivalent to British Pat. No. 1,024,083) and constitutes an extremely rigid and low-friction connection between the table and the bed.

For the advancing drive in accordance with the invention the two guide rails 3 and 4 are provided with gear teeth 15 and 16 so that they form two racks for the advancing drive. This functional combination not only provides the basis for an excellent tooth engagement, since the gear teeth can easily be produced so as to be precisely parallel to the attachment prismatic element and to the roller guide tracks, but it also leads to a substantial advantage as regards cost owing to dispensing with a separate rack, with machining of the attachment faces, and with screws for the attachment and fitting operations.

The gear teeth 15 on the guide rail 3 engage, in the embodiment shown in FIG. 1, with a pinion 17 of an advance drive shaft 18, while a pinion 19 engages the gear teeth 16 on the guide rail 4. The pinion 19 is rotatably mounted on the drive shaft 18 but cannot slide. The connection of the pinion 19 with the drive shaft 18 is carried out by means of a clamping coupling 20. This is mounted in a sliding manner on a part 21 with multiple wedge faces, or the like, of the drive shaft 18 so that the coupling 20 can be slid but cannot rotate in relation to the shaft 18.

Figure 6:
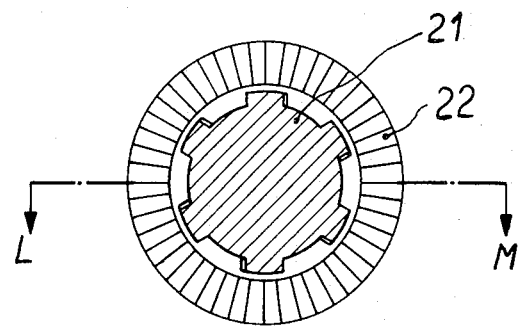
FIG. 6 shows a cross-section through a wedge profile looking towards the spur gearing of the connecting coupling.
Figure 7:
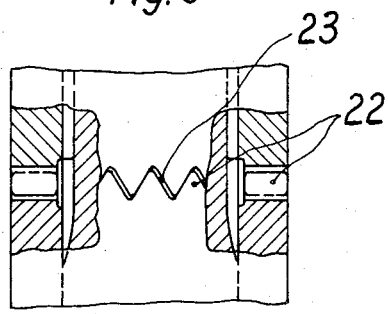
FIG. 7 is a longitudinal section through the spur gearing and an elevation of it on the line L-M of FIG. 6.
Figure 8:
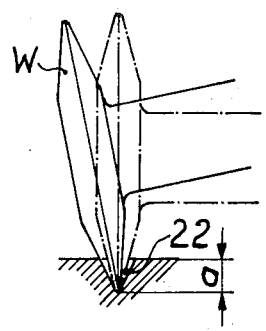
FIG. 8 shows the tilting movement of the tool producing the spur gearing.
Figure 9:
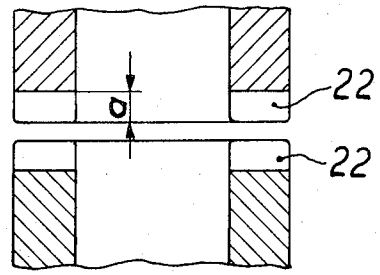
FIG. 9 shows a cross-section through two gear elements opposite each other and drawn out of engagement.

Between the pinion 19 and the clamping coupling 20 a connection is produced by means of spur gear teeth 22, as shown in detail in FIGS. 6, 7 and 8. While conventional spur gear teeth have teeth depths which become less unless in accordance with the radial extent of the teeth in an inward direction, the tooth depth $a$ in the case of the spur teeth in accordance with the invention is constant. The flank angle, however, becomes less in an inward direction in accordance with the radial course of the teeth. This change in the flank angle is achieved by swinging the tool W producing the flanks in accordance with the radial distance of the tool from the axis of the workpiece, that is to say the tool axis is tilted in accordance with the radial advance or feed. The spur teeth so produced have both an axial setting path of the full tooth height and also a correct flank engagement surface.

In the case of the use of the novel spur teeth all elements responsible for the rotary characteristics of the system, such as the pinion on the rack, the multi-flat profile to the engagement gear teeth and to the spur teeth are so designed within conventional tolerances that on engagement of the spur teeth an angular departure of 2° to 3° on the engagement of all teeth flanks of the various elements of the system is present in the corresponding direction of rotation. This angular departure is denoted by reference numeral 23 in FIG. 7 and constitutes the actual means for taking up play, that is to say for pre-loading the engagement of teeth as soon as the clamping coupling 20 is pressed axially by means of a nut 24. Since all elements used in the system are substantially stiff, the axial displacement of the clamping coupling 20 is very small.

In the case of the embodiment of the invention shown in FIG. 1 the toothed engagement 15 between the guide rail 3 and the pinion 17 is pre-loaded in the one direction of rotation, and the toothed engagement 16 between the guide rail 4 and the pinion 19 is pre-loaded in the opposite direction of rotation. Since this leads to substantial skew forces which may be produced by this, this construction is basically suitable in the case of a small distance between the two guides 3 and 4 and in the case of advancing forces which are not excessively large.

Figure 2:
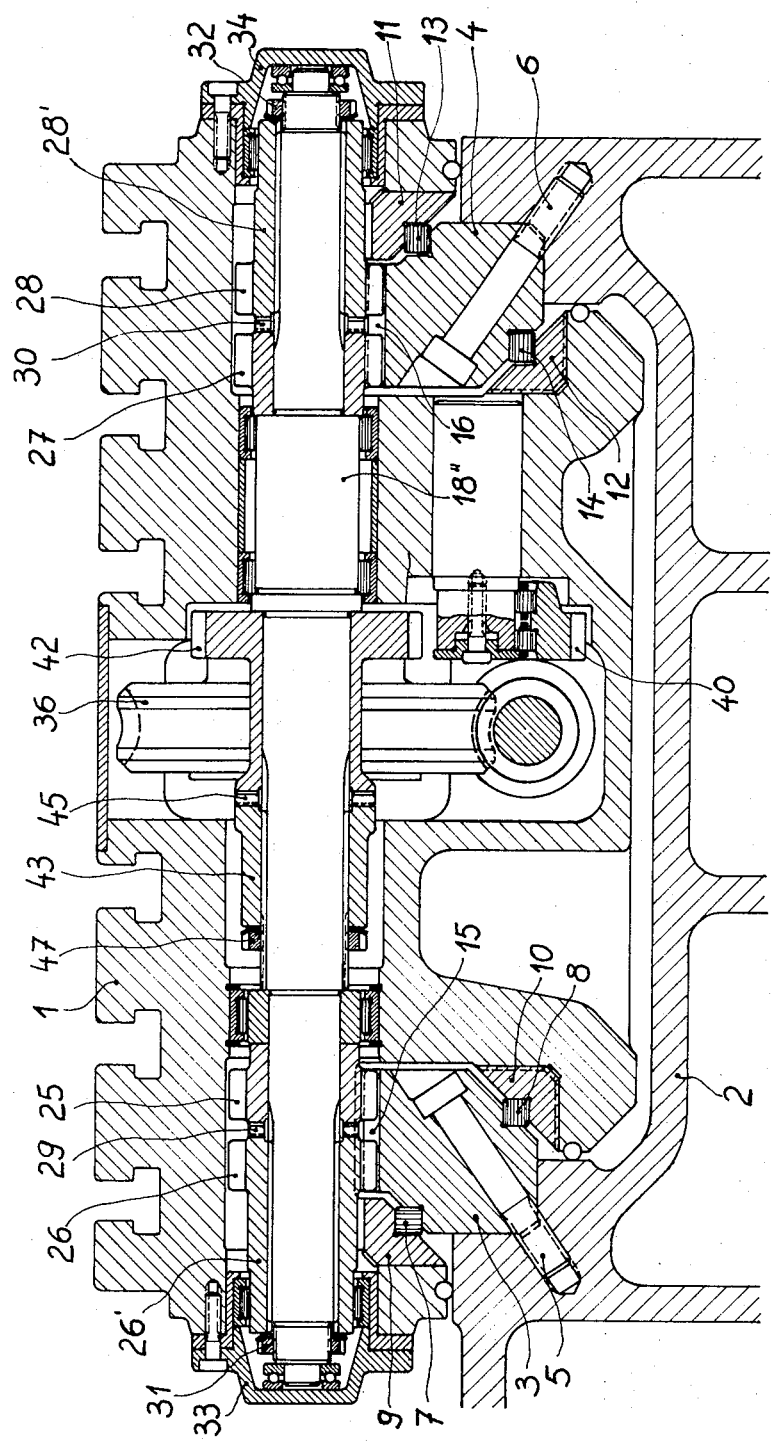
FIG. 2 shows the same machine table with an advancing drive by means of double pinions which can be mutually preloaded on each of the two racks, in a vertical cross-section on the line C-D of FIG. 5.

A form of the invention which in this respect is improved is shown in FIG. 2. In this case the teeth 15 and 16 of the guide rails 3 and 4 engage with two respective pinions 25 and 26, and 27 and 28, respectively, which are connected by the spur teeth 29 and 30, respectively, with a pre-loading force. In this respect the pinions 26 and 27 can be freely rotated but cannot be displaced on the shaft 18. The pre-loading is set by means of nuts 31 and 32, respectively. These nuts are readily accessible from outside after removal of the covers 33 and 34, respectively.

Figure 3:
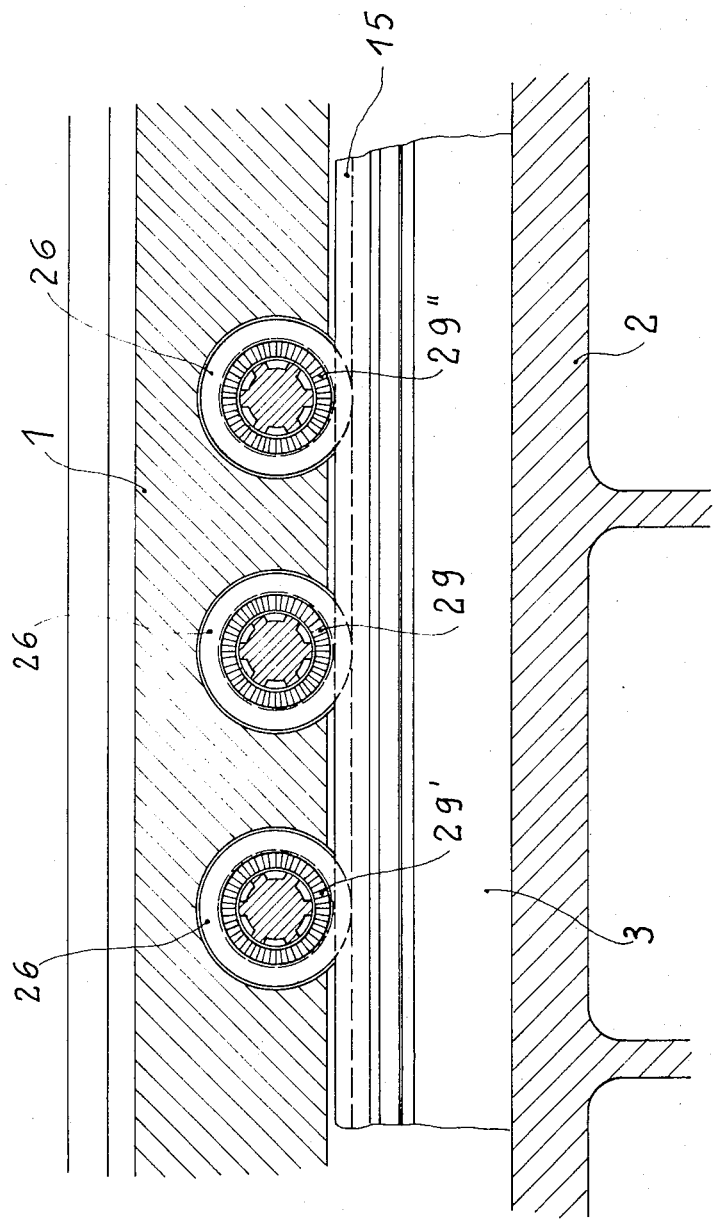
FIG. 3 shows a longitudinal section through the advancing drive with three pinions on one rack on the line E-F of FIG. 4.
Figure 4:
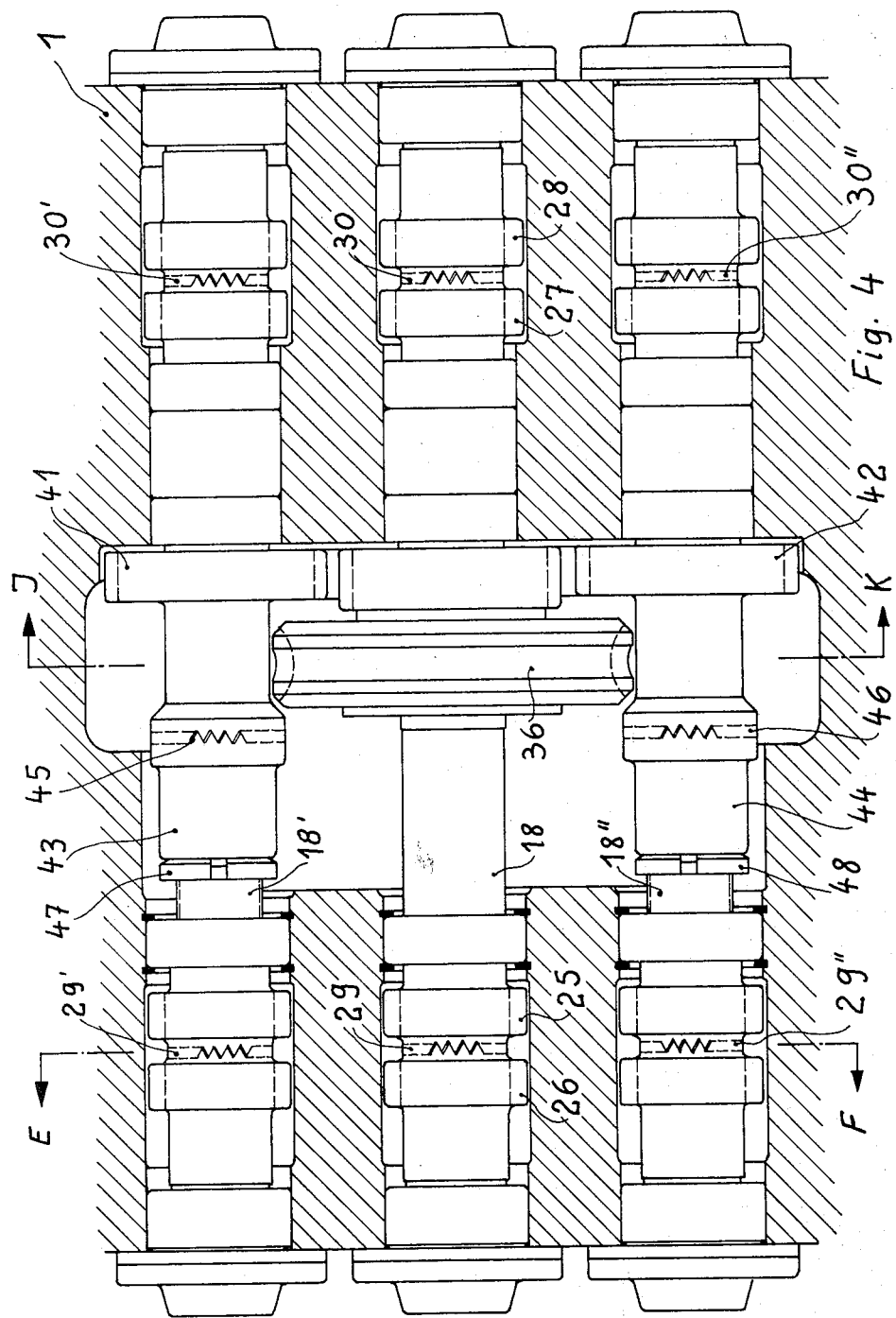
FIG. 4 shows a horizontal section with three double pinions on the line G-H of FIG. 5.

FIGS. 3 and 4 show how the stiffness of an advancing drive in accordance with the invention can be still further increased by the use of several, that is to say in the specific example shown three pinion shafts 18, 18', 18'' with six pinions. FIG. 3 shows in a longitudinal section through the machine table 1 the engagement of three pinions 25 and 26 with the teeth 15 of the guide rail 3, 27 and 28, respectively, with the teeth 16 of the guide rail 4.

Figure 5:
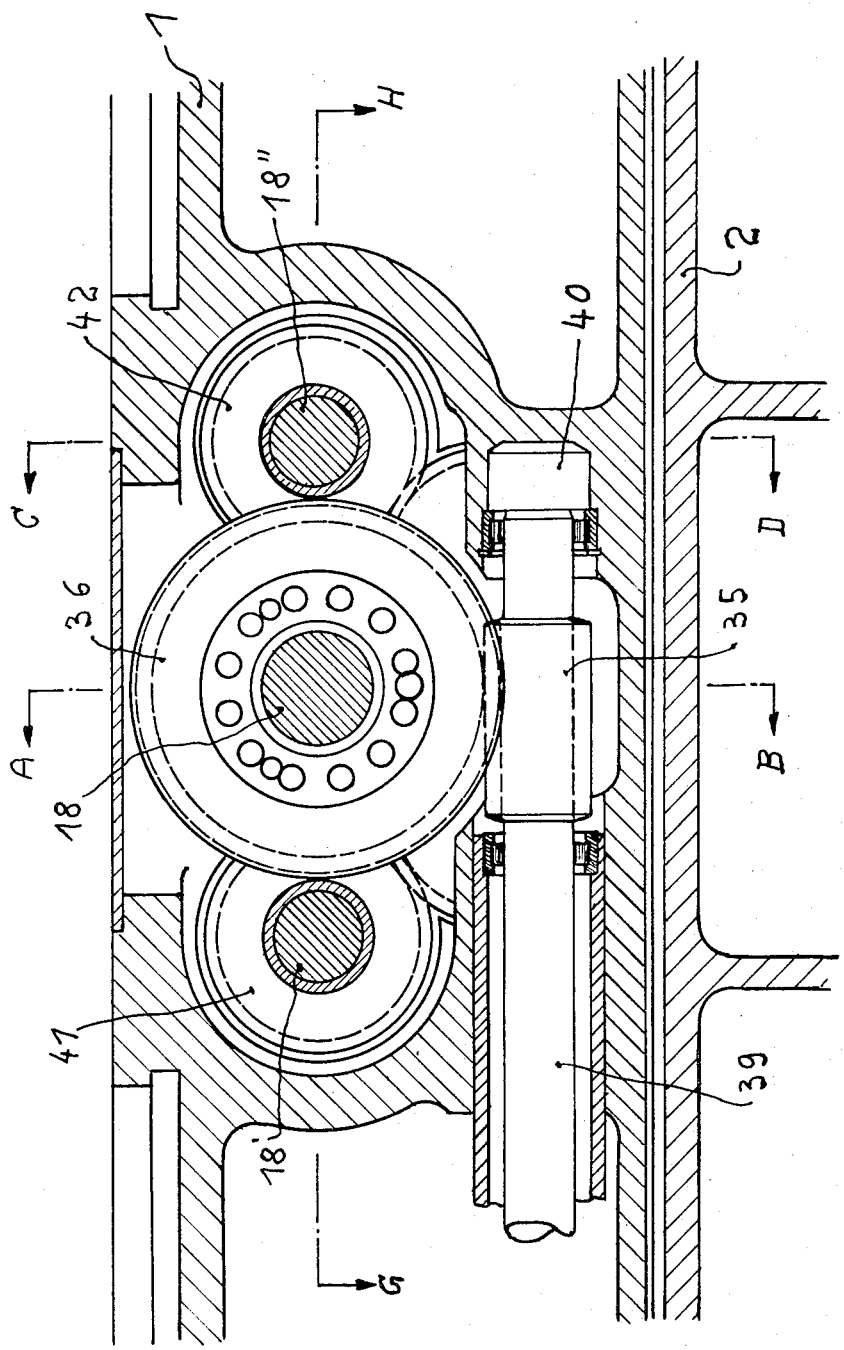
FIG. 5 shows the drive of the three pinion shafts with a worm and a worm wheel and intermediate wheels between the pinion shafts, in a vertical longitudinal section on the line J-K of FIG. 4.

FIG. 4 shows a horizontal section through the machine table 1 with three pinion shafts of the type shown in FIG. 2. The advancing drive is brought about via a worm 35 acting on a worm wheel 36 as shown in FIGS. 1 and 5. The teeth engagement between the worm and the worm wheel is made free of play in a conventional manner by adopting the feature of providing the flanks of the worm thread with different pitches. By axial displacement of the worm 35 the tooth play can be adjusted. The worm wheel 36 is fixed on the shaft 18 using end discs 37. The gear wheel 38 is connected by means of the screw thread with the worm wheel 36 and transmits the drive via the intermediate wheels 39 and 40, respectively, necessary for synchronisation of the direction of movement, to the gear wheels 41 and 42, respectively, of the two additional pinion shafts 18' and 18''. The connection of the two gear wheels 41 and 42, respectively, with their pinion shafts is carried out in a manner which allows clamping or tightening via clamping couplings 43 and 44, respectively, using spur gear teeth 45 and 46, respectively, and the nuts 47 and 48, respectively.

For simple arrangement it is naturally also possible to construct only one of the two guide rails as a rack and to provide the pinion shafts 18 with a pre-loadable double pinion 25 and 26.

What I claim is:

1. An advancing drive for the slide of a machine tool or the like on a machine bed, comprising at least one drive shaft rotatably mounted on the slide, means for rotating said shaft, spaced guide rails mounted on the bed, rolling bodies on said shaft journalled on said guide rails for guiding the slide, at least one of said guide rails having rack teeth thereon, and one of said rolling bodies comprising a pinion wheel mounted on said drive shaft and being in meshing engagement with teeth of said one guide rail.

2. The advancing drive according to claim 1 wherein axially movable track rails are provided on the bed in engagement with said guide rails for pre-loading same.

3. The advancing drive according to claim 1 wherein said pinion wheel is mounted for free rotation relative to said drive shaft, means on said shaft preventing axial movement of said pinion wheel with respect thereto, a clamping coupling mounted on said drive shaft for rotation therewith, said coupling being axially movable relative to said shaft and having spur gear teeth thereon engageable with like spur teeth provided on said pinion wheel.

4. The advancing means according to claim 3 wherein a nut threadedly engaged on said drive shaft retains said clamping coupling in place, adjustment of said nut on said shaft serving to adjust the engagement between said spur gears.

5. The advancing means according to claim 4 wherein two drive shafts are provided in a common plane, a pinion wheel being mounted on each said shaft in meshing engagement with the teeth of said one guide rail, one of said pinions being mounted for free rotation on one of said drive shafts, and the other of said pinions being connected with said clamping coupling by means of said spur gear teeth engagement.

6. The advancing means according to claim 5 wherein said spur gear teeth have a constant tooth depth and a tooth flank angle which decreases inwardly in a radial direction.

7. The advancing means according to claim 1 wherein at least two of said drive shafts are provided parallel to one another, pinion wheels mounted for free rotation on each said shaft in meshing engagement with the teeth of said one guide rail, clamping couplings on each said shaft for rotation therewith having spur gear teeth in engagement with like spur gear teeth on each said pinion wheel.

8. The advancing drive according to claim 7 wherein one of said drive shafts is driven directly by said drive means, and the other of said drive shafts is driven by said one drive shaft via gear wheels provided thereon, and a clamping coupling mounted on said other drive shaft for rotation therewith having spur gear teeth thereon in engagement with like spur gear teeth on said gear wheels.

* * * * *